UNITED STATES PATENT OFFICE.

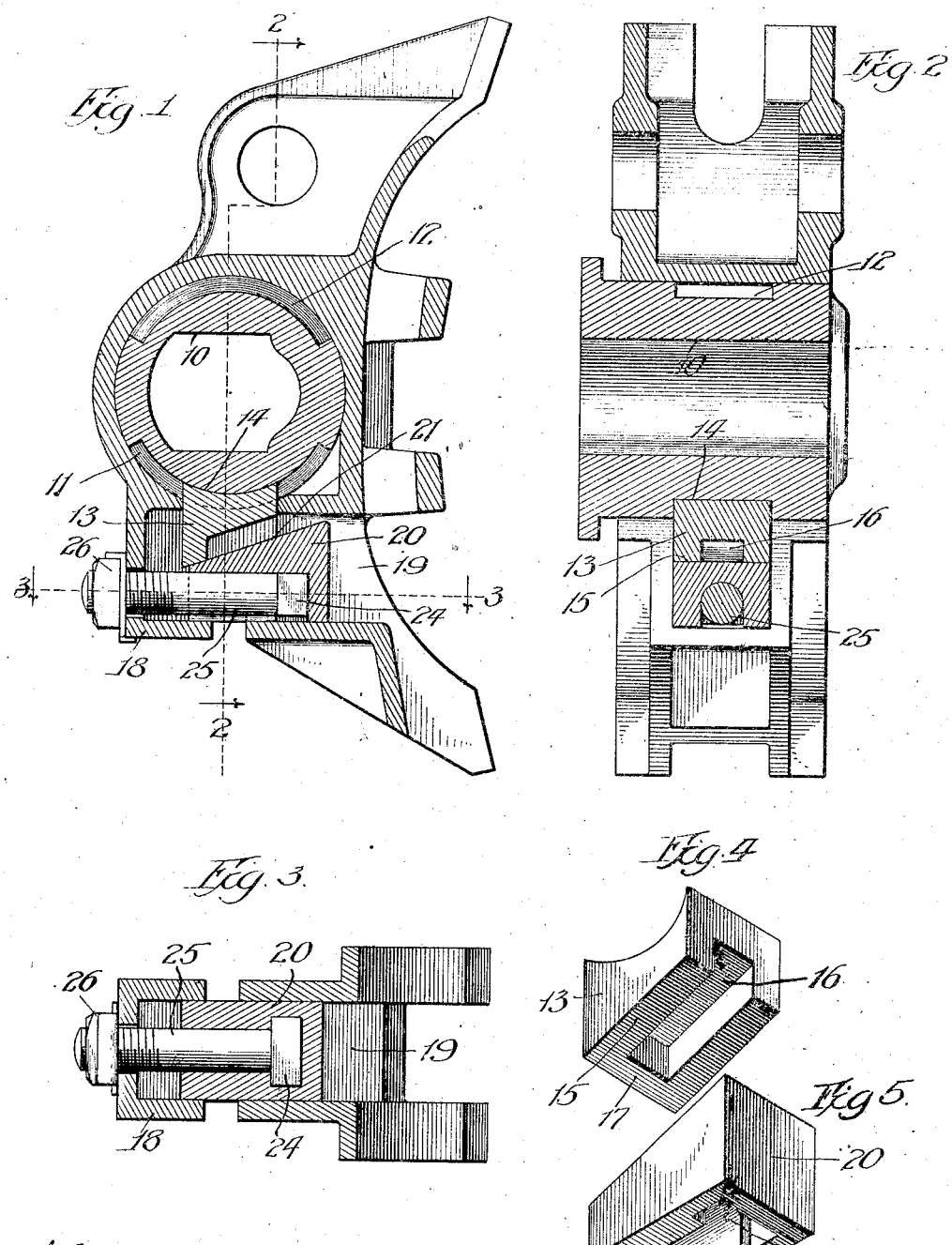

WILLIAM E. FOWLER, JR., OF HAMMOND, INDIANA, ASSIGNOR TO SIMPLEX RAILWAY APPLIANCE COMPANY, OF CHICAGO, ILLINOIS, A CORPORATION OF ILLINOIS.

BRAKE-BEAM.

990,855.   Specification of Letters Patent.   Patented May 2, 1911.

Application filed November 7, 1910. Serial No. 591,174.

*To all whom it may concern:*

Be it known that I, WILLIAM E. FOWLER, Jr., a citizen of the United States, and residing at Hammond, in the county of Lake and State of Indiana, have invented certain new and useful Improvements in Brake-Beams, of which the following is a specification.

My invention relates to brake beams and has particular reference to adjustable brake heads for application to said beams.

Brake beams for use on passenger trains are usually equipped with brake heads which are rotatably mounted on the ends of said beams and it has been found desirable to so arrange the heads that they may be securely locked in proper position on the ends of the beams. Many forms of adjustable brake heads have been devised but it is my object to so arrange the head with relation to the beam that the maximum of holding strength may be secured within the limited space allowed for such locking means.

A further object is the provision of locking means which shall at the same time be adapted to prevent the withdrawal of the head until the brake shoe mounted on the face of said head, including the fastening pin therefor, are removed.

This invention is an improvement upon the form of adjustable brake head shown in my Patents No. 906,213, dated December 8, 1908 and No. 920,944, dated May 11, 1909.

My invention will be more readily understood by reference to the accompanying drawings, wherein, Figure 1 is a sectional elevation of my novel brake head; Fig. 2 is a section on the line 2—2 of Fig. 1; Fig. 3 is a section on the line 3—3 of Fig. 1, and Figs. 4 and 5 are perspective views of the locking and wedge blocks respectively.

Referring more particularly to the drawings, it will be seen that a sleeve 10, having the usual opening therethrough for the accommodation of the end of a channel compression member and rod tension member (not shown) is provided with discontinuous peripheral grooves 11, 12, within one of which is adapted to be seated a locking block 13, having an upper portion 14, curved to the radius of the sleeve. The lower portion 15 is angular and wedge shaped, a recess 16 being provided in order to reduce the weight as well as to reduce friction between the co-acting parts. It will be seen that I leave an end wall 17, the purpose of which will be later described. The brake head has the usual configuration on its face, the body portion 18 being, however, split as shown in my original Patent No. 906,213. An opening 19 is provided through the face of the brake head through which the wedge block 20 is entered. This block 20 is provided with an upper wedge surface 21, formed at an angle equal to that of the surface 15 on the part 13. The lower portion of the block 20 is provided with a groove 22, having an enlarged portion 23, within which is adapted to be seated the T-head 24, of a bolt 25. A nut 26, threaded on the end of the bolt 25, provides the means for drawing the parts into locking relation with the sleeve 10.

If desired, the surface 14, of the bottom of the groove 11, in the part 10, may be corrugated or roughened, although I do not deem this essential in the operation of my device.

It will be seen that a new locking action is secured by the operation of parts as herein shown; that is, a combined action of expansion and contraction. Assuming the parts in the loose position, by tightening the nut 26, the bolt and the wedge block 20 are drawn against the wedge surface of the block 13, this causing the pure wedging action of the parts against the sleeve. While this tightening is going on, the nut 26 will also tend to tighten the split portion of the head around the sleeve thus securing the advantage of friction over the entire surface of the said sleeve. As will now be seen, it becomes necessary to entirely remove the locking block 20 and bolt 25 from the head through the opening 19, before the locking block 13 may descend far enough to allow the head to be removed from the sleeve. Therefore if the nut 26 should become lost the head could not come off from the sleeve as long as the brake shoe and key were in place upon the said head. I therefore consider that I have devised a construction which will at all times prevent the accidental removal of the head from the beam.

Inasmuch as various modifications will readily suggest themselves to those skilled in the art, I do not wish to be limited to the precise construction herein shown and described.

I claim:

1. In a device of the character described, the combination of a brake beam, a brake head angularly adjustable thereon, a plurality of separate means to hold said head in adjusted position, and a common positive operating means for all of said holding means, substantially as described.

2. A brake beam comprising in combination an end portion, a brake head angularly adjustable thereon, wedge means mounted within said head and means whereby said head may be tightened upon said end portion simultaneously with the operation of said wedge means, substantially as described.

3. A brake beam comprising an end member, a split brake head rotatably mounted thereon, wedge means mounted within said head, and means for tightening said head on said end member and operating said wedge means, substantially as described.

4. In a device of the character described, the combination of a brake beam, a split brake head angularly adjusted thereon, a lock-block adapted to hold said brake head in adjusted position, a wedge to operate said lock-block and actuating means to move said wedge, said wedge and actuating means being also adapted to contract the head in holding engagement on the beam, substantially as described.

5. In a device of the character described, the combination of a recessed brake beam, a split brake head angularly adjusted thereon, a lock-block adapted to enter said recess and have frictional engagement with said beam, a wedge to operate said lock-block and means to actuate said wedge, said wedge and its actuating means operating also to contract the split head on the beam, substantially as described.

6. In a device of the character described, the combination of a recessed brake beam, a split brake head angularly adjusted thereon, a lock-block adapted to enter said recess and by engagement with the beam hold the head in adjusted position and adapted also to prevent longitudinal shifting of the head, operating means to force said lock-block into holding engagement with the beam and to contract the head on the beam, said lock-block being prevented from leaving said recess so long as said operating means is in position, substantially as described.

7. In a device of the character described, the combination of a recessed brake beam, a split brake head angularly adjusted thereon, a lock-block adapted to enter said recess and prevent withdrawal of the head from the beam so long as it remains in said recess, said lock-block being adapted to bear against said brake beam and hold the head in adjusted position, and operating means to engage said lock-block and contract said head upon said beam, said operating means being prevented from shifting sufficiently by the brake shoe to release said lock-block from the brake beam recess substantially as described.

8. A brake beam comprising in combination, an end member, a split brake head rotatably mounted on said end member, wedge means mounted within said head, said head being provided with an opening in its face through which said wedge means are adapted to be inserted, and means for tightening said split head and operating said wedge means, substantially as described.

WILLIAM E. FOWLER, Jr.

Witnesses:
JOHN W. MAITHLAND,
CARL E. BAUER.